United States Patent [19]

Iiyama et al.

[11] Patent Number: 4,880,762
[45] Date of Patent: Nov. 14, 1989

[54] COLORING PHTHALIDE COMPOUNDS, METHOD OF PRODUCING THE COMPOUNDS AND RECORDING MATERIALS USING ANY OF THE COMPOUNDS AS COLORING COMPONENT

[75] Inventors: Kiyotaka Iiyama, Mishima; Kunio Hayakawa, Gotemba, both of Japan

[73] Assignee: Ricoh Company, Ltd., Tokyo, Japan

[21] Appl. No.: 123,350

[22] Filed: Nov. 20, 1987

[30] Foreign Application Priority Data

Nov. 21, 1986 [JP] Japan .................. 61-278368

[51] Int. Cl.[4] .................. B41M 5/16; B41M 5/18; B41M 5/22
[52] U.S. Cl. .................. 503/220; 427/151; 428/913; 428/914; 503/223
[58] Field of Search .................. 427/151; 428/913, 914; 503/217, 220, 223, 215

[56] References Cited

FOREIGN PATENT DOCUMENTS 0008364 1/1985 Japan .................. 503/220

Primary Examiner—Bruce H. Hess
Attorney, Agent, or Firm—Oblon, Spivak, McClelland, Maier & Neustadt

[57] ABSTRACT

Coloring phthalide compounds having general formula [I], a method of producing the phthalide compounds and a recording material comprising as a coloring component any of the coloring phthalide compounds are disclosed,

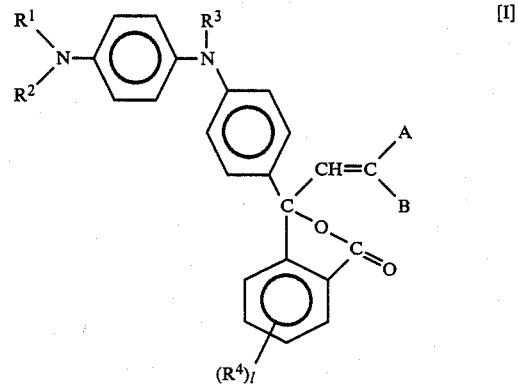

wherein $R^1$ and $R^2$ each represent a straight chain or branched alkyl group having 1 to 6 carbon atoms, a cycloalkyl group, or a benzyl group, and $R^1$ and $R^2$ in combination may form a ring; $R^3$ represents an alkyl group having 1 to 4 carbon atoms; $R^4$ represents a dialkylamino group having 1 to 6 carbon atoms, a cyclic amino group or halogen, l is an integer of 0 to 4; A represents

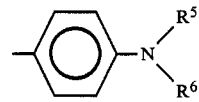

wherein $R^5$ and $R^6$ each represent a straight chain or branched alkyl group having 1 to 8 carbon atoms, a cycloalkyl group, or a benzyl group, $R^5$ and $R^6$ in combination may form a ring; and B is the same as A, or represents a phenyl group which may have a substituent.

6 Claims, 1 Drawing Sheet

PHTHALIDE COMPOUND NO. I IN TABLE I

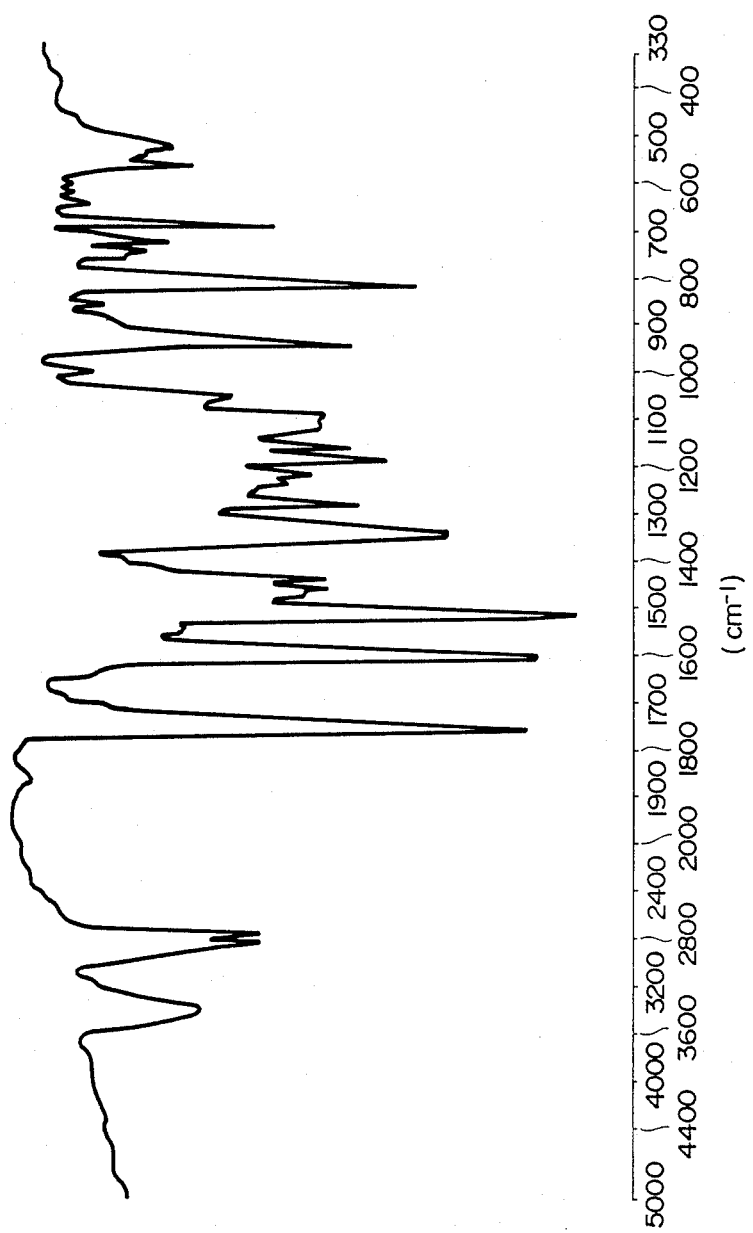

COLORING PHTHALIDE COMPOUNDS, METHOD OF PRODUCING THE COMPOUNDS AND RECORDING MATERIALS USING ANY OF THE COMPOUNDS AS COLORING COMPONENT

BACKGROUND OF THE INVENTION

The present invention relates to novel coloring phthalide compounds, a method of producing the compounds, and recording materials using any of the phthalide compounds as coloring component, which recording materials are capable of producing images having light absorbancy in the near infrared region by thermosensitive recording, pressure-sensitive recording or by use of laser beams, or the like.

A conventional pressure-sensitive recording material utilizes a chemical reaction between a colorless or light-colored leuco dye and a color developer capable of inducing color formation in the leuco dye to form colored images. More specifically, the pressure-sensitive recording material comprises (i) a coloring leuco dye sheet coated with a leuco dye which is dissolved in an organic solution and microcapsuled and (ii) a color developer sheet coated with a color developer for the leuco dye and a binder agent. The coloring leuco dye sheet is superimposed on the color developer sheet and pressure is applied thereto in such a manner that the microcapsules containing the leuco dye are ruptured so as to react with the color developer.

A conventional thermosensitive recording material generally comprises a support such as paper, synthetic paper or plastic film, and a thermosensitive coloring layer comprising as the main components a leuco dye and a color developer capable of inducing color formation in the leuco dye upon application of heat thereto to form colored images. The application of heat for such image formation is carried out, for instance, by use of minute heat generating resistance elements, such as a thermal head and a thermal pen.

These pressure-sensitive and thermosensitive recording materials are widely used because recording can be carried out more speedily by using a relatively simple device, without the necessity for complicated processing such as development and fixing of images, as compared with the recording materials for electrophotography and elecrostatic recording.

Conventionally employed representative leuco dyes for use in such recording materials are Crystal Violet Lactone and Leuco Crystal Violet which are for blue-coloring, and fluorane compounds having an anilino substituent at is 3 position and an anilino substituent at its 7 position which are for black coloring.

Recently optical character-reading apparatus have been developed, for example, for reading bar codes in bar-code labels, and are used in a variety of fields. In these apparatus, light sources emitting light having a light wavelength of 700 nm or more, such as a light emit diode and a semi-conductor laser, are in general use. However, the above-mentioned leuco dyes, when colored blue or black, scarcely absorb the light in the near infrared region having a wavelength of 700 nm or more, so that the reading of the developed color is not possible with the above-mentioned recording apparatus.

Accordingly, there is a strong need for the development of a new leuco dye for which the optical absorbancy wave length of the color forming material is greater than 700 nm.

Examples of such a leuco dye are the monovinyl coloring phthalide compounds disclosed in Japanese Laid Open Patent Application Nos. 51-121037 and 57-167979. These compounds, in comparison with the compounds which do not have a monovinyl group, have an absorbancy greater than the 750 nm vicinity and can exhibit absorption in the near infrared region. However, there absorbancy in the region greater than 750 nm is very weak so they do not fulfil the requirements for such a material.

SUMMARY OF THE INVENTION

It is therefore an object of the present invention to provide novel coloring phthalide compounds, which, when colored, absorb the light in a near infrared region of 600~1000 nm or more.

Another object of the present invention is to provide a method of producing the novel coloring phthalide compounds.

A further object of the present invention is to provide a recording material by using any of the above coloring phthalide compounds as its coloring component.

The coloring phthalide compounds according to the present invention have the following general formula (I):

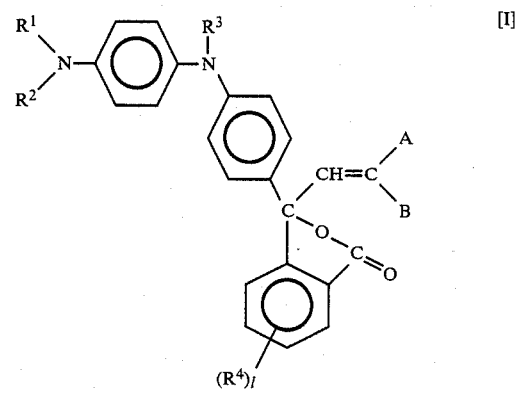

wherein $R^1$ and $R^2$ each represent a straight chain or branched alkyl group having 1 to 6 carbon atoms, a cycloalkyl group, or a benzyl group, and $R^1$ and $R_2$ in combination may form a ring; $R^3$ represents an alkyl group having 1 to 4 carbon atoms; $R^4$ represents a dialkylamino group having 1 to 6 carbon atoms, a cyclic amino group or halogen, l is an integer of 0 to 4; A represents

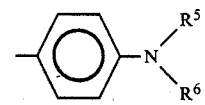

wherein $R^5$ and $R^6$ each represent a straight chain or branched alkyl group having 1 to 8 carbon atoms, a cycloalkyl group, or a benzyl group, $R^5$ and $R^6$ in combination may form a ring; and B is the same as A, or represents a phenyl group which may have a substituent.

The coloring phthalide compounds having the general formlua [I] can be prepared by allowing a keto acid having the following general formula [Ia] to react with an ethylene compound having the following general formula [Ib], with dehydration and condensation of the two compounds:

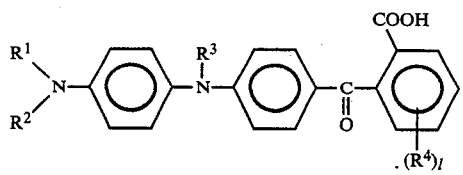

wherein $R^1$, $R^2$, $R^3$, $R^4$ and l are the same as those defined previously in the formula [I].

wherein A and B are the same as those defined previously in the formula [I].

The recording material according to the present invention uses the above coloring phthalide compounds as its coloring component since the above-mentioned coloring phthalide compounds are in the form of a white or a light-colored powder at normal temperature, which exhibit strong absorbancy in the near infrared region of 600 to 1000 nm or greater, with a color of blue to green, when developed by being brought into contact with a developer.

BRIEF DESCRIPTION OF THE DRAWING

In the drawing, the single FIGURE is an infrared absorption spectrum of Phthalide Compound No. in Table 1.

DETAILED DESCRIPTION OF THE PREFERRED EMBODIMENTS

Specific examples of a coloring phthalide compound having the general formula [I] according to the present invention are shown in Table 1.

The coloring phthalide compounds having the general formula [I] can be prepared by allowing a keto acid having the following general formula [Ia] to react with an ethylene compound having the following general formula [Ib] in the presence of a dehydrating condensation agent:

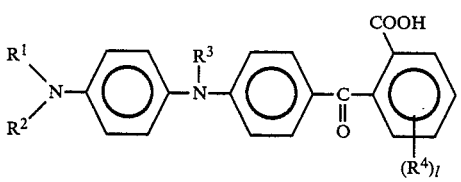

+

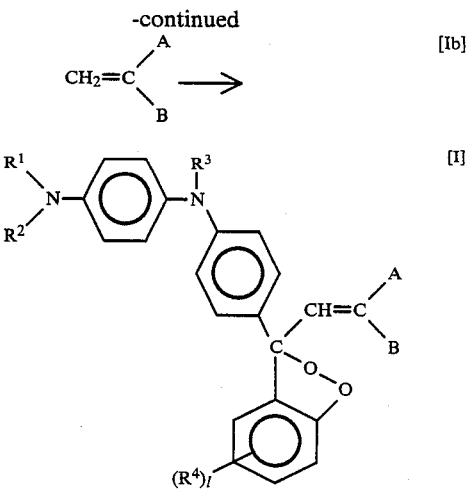

wherein $R^1$, $R^2$ $R^3$, $R^4$, A, B and l are the same as those defined previously.

Examples of a dehydrating condensation agent for the above reaction are lower fatty acid anhydrides such as acetic anhydride and propionic anhydride which may serve as a solvent for the above reaction as well, inorganic acids such as phosphorus oxychloride, phosphorus trichloride, sulfuric acid, and polyphosphoric acid and a variety of conventional Friedel-Crafts catalysts.

In the present invention, the compound having the above formula [Ia] can be prepared by reacting a substituted aniline and a substituted phthalic anhydride in the pesence of a Friedel-Crafts catalyst as shown below or by reacting a substituted aminobenzaldehyde with a substituted benzoic acid in the presence of a dehydrating catalyst such as acetic anhydride or sulfur acid:

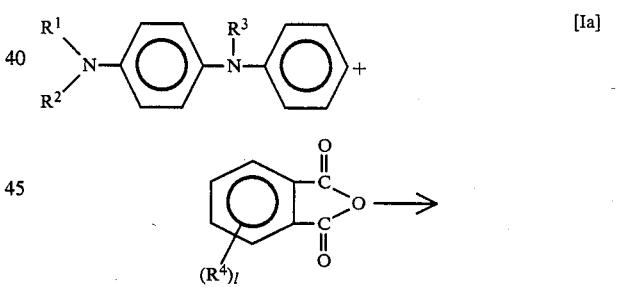

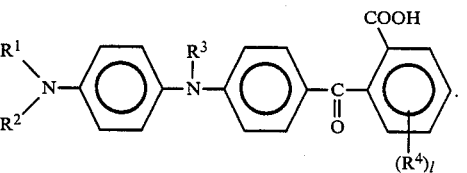

The following Table 1 shows specific examples of a phthalide compound for use in the present invention and of the starting materials therefor.

| No | [Ia] | [Ib] | [I] | Developed Color Tone |
|---|---|---|---|---|
| 1 | (structure with N(CH₃)₂ groups) | (structure with N(CH₃)₂ groups) | (structure with N(CH₃)₂ groups) | Greenish Blue |
| 2 | (structure with CH₃/isoC₃H₇ and CH₃/CH₃ groups) | (structure with CH₃/CH₃ and CH₃/isoC₃H₇ groups) | (structure with CH₃/CH₃ and CH₃/isoC₃H₇ groups) | Dark Green |
| 3 | (structure with N(C₂H₅)₂ groups) | (structure with N(C₂H₅)₂ groups) | (structure with N(C₂H₅)₂ groups) | Dark Green |

| No | [Ia] | [Ib] | [I] | Developed Color Tone |
|---|---|---|---|---|
| 4 | (structure) | (structure) | (structure) | Dark Green |
| 5 | (structure) | (structure) | (structure) | Bluish Green |
| 6 | (structure) | (structure) | (structure) | Green |

| No | [Ia] | [Ib] | [I] | Developed Color Tone |
|---|---|---|---|---|
| 7 | (structure) | (structure) | (structure) | Bluish Green |
| 8 | (structure) | (structure) | (structure) | Bluish Green |
| 9 | (structure) | (structure) | (structure) | Dark Green |

-continued

| No | [Ia] | [Ib] | [I] | Developed Color Tone |
|---|---|---|---|---|
| 10 | | | | Blue |
| 11 | | | | Dark Green |
| 12 | | | | Dark Green |

| No | [1a] | [1b] | [1] | Developed Color Tone |
|---|---|---|---|---|
| 13 | (iso-C₃H₇)(CH₃)N-C₆H₄-N(CH₃)-C₆H₄-C(=O)-C₆H₄(COOH) with iso-C₃H₇ | CH₂=C(C₆H₄-N(CH₃)₂)(C₆H₄-N(CH₃)-C₆H₄-N(iso-C₃H₇)₂ with CH₃ branches) | Phthalide structure with N(CH₃)₂, N(CH₃)-C₆H₄-N(iso-C₃H₇)₂ groups | Dark Green |
| 14 | Same as above | CH₂=C(C₆H₄-N(C₂H₅)₂)(C₆H₄-N(CH₃)-C₆H₄-N(C₂H₅)(iso-C₃H₇)) | Phthalide structure with N(CH₃)₂, N(CH₃)-C₆H₄-N(C₂H₅)(iso-C₃H₇) groups | Dark Green |
| 15 | (iso-C₃H₇)(C₂H₅)N-C₆H₄-N(CH₃)-C₆H₄-C(=O)-C₆H₄(COOH) | CH₂=C(C₆H₄-N(CH₃)₂)(C₆H₄-N(CH₃)-C₆H₄-N(iso-C₃H₇)(C₂H₅)) | Phthalide structure with N(CH₃)₂, N(CH₃)-C₆H₄-N(iso-C₃H₇)(C₂H₅) groups | Dark Green |

-continued

| No | [Ia] | [Ib] | [I] | Developed Color Tone |
|---|---|---|---|---|
| 16 | (iso-C₃H₇)(CH₃)N–C₆H₄–N(C₂H₅)–C₆H₄–C(=O)–(2-COOH-C₆H₄) | CH₂=C(C₆H₄-N(CH₃)₂)(C₆H₄-N(CH₃)₂) | phthalide structure with two p-(dimethylamino)phenyl groups and one p-(N-ethyl-N-(p-(N-isopropyl-N-methylamino)phenyl)amino)phenyl group | Dark Green |
| 17 | (iso-C₃H₇)(CH₃)N–C₆H₄–N(iso-C₃H₇)–C₆H₄–C(=O)–(2-COOH-C₆H₄) | CH₂=C(C₆H₄-N(CH₃)₂)(C₆H₄-N(CH₃)₂) | phthalide structure with two p-(dimethylamino)phenyl groups and one p-(N-isopropyl-N-(p-(N-isopropyl-N-methylamino)phenyl)amino)phenyl group | Dark Green |
| 18 | (CH₃)₂N–C₆H₄–N(CH₃)–C₆H₄–C(=O)–(2-COOH-C₆H₄) | CH₂=C(C₆H₄-N(CH₃)₂)(4-Cl-C₆H₄) | phthalide structure with one p-(dimethylamino)phenyl group, one 4-chlorophenyl group, and one p-(N-methyl-N-(p-(dimethylamino)phenyl)amino)phenyl group | Green |

-continued

| No | [Ia] | [Ib] | [I] | Developed Color Tone |
|---|---|---|---|---|
| 19 | | | | Dark Green |
| 20 | | | | Dark Green |
| 21 | | | | Greenish Blue |

-continued

| No | [Ia] | [Ib] | [I] | Developed Color Tone |
|---|---|---|---|---|
| 22 | | | | Dark Green |
| 23 | | | | Blue |
| 24 | | | | Greenish Blue |

-continued

| No | [Ia] | [Ib] | [I] | Developed Color Tone |
|----|------|------|-----|----------------------|
| 25 | Same as above | | | Blue |
| 26 | | | | Greenish Blue |
| 27 | | | | Greenish Blue |

-continued

| No | [Ia] | [Ib] | [I] | Developed Color Tone |
|---|---|---|---|---|
| 28 | (structure) | (structure) | (structure) | Blue |

In the present invention, the phthalide compounds having the general formula [I] can be used in combination with conventional leuco dyes.

Examples of such conventional leuco dyes are triphenylmethane-type leuco compounds, fluoran-type leuco compounds, phenothiazine-type leuco compounds, auramine-type leuco compounds, spiropyran-type leuco compounds and iodolinophthalide-type leuco compounds are preferably employed.

Specific examples of those leuco dyes are as follows:
3,3-bis(p-dimethylaminophenyl)-phthalide,
3,3-bis(p-dimethylaminophenyl)-6-dimethylaminophthalide
3,3-bis(p-dimethylaminophenyl)-6-diethylaminophthalide,
3,3-bis(p-dimethylaminophenyl)-6-chlorophthalide,
3,3-bis(p-dibutylaminophenyl)-phthalide,
3-cyclohexylamino-6-chlorofluoran,
3-dimethylamino-5,7-dimethylfluoran,
3-diethylamino-7-chlorofluoran,
3-diethylamino-7-methylfluoran,
3-diethylamino-7,8-benzfluoran,
3-diethylamino-6-methyl-7-chlorofluoran,
3-(N-p-tolyl-N-ethylamino)-6-methyl-7-anilinofluoran,
3-pyrrolidino-6-methyl-7-anilinofluoran,
2-[N-(3'-trifluoromethylphenyl)amino]-6-diethylaminofluoran,
2-[3,6-bis(diethylamino)-9-(o-chloroanilino)xanthylbenzoic acid lactam],
3-diethylamino-6-methyl-7-(m-trichloromethylanilino)fluoran,
3-diethylamino-7-(o-chloroanilino)fluoran,
3-dibutylamino-7-(o-chloroanilino)fluoran,
3-N-methyl-N-amylamino-6-methyl-7-anilinofluoran,
3-N-methyl-N-cyclohexylamino-6-methyl-7-anilinofluoran,
3-diethylamino-6-methyl-7-anilinofluoran,
3-(N,N-diethylamino)-5-methyl-7-(N,N-dienzylamino)fluoran, benzoyl leuco methylene blue,
6'-chloro-8'-methoxy-benzoindolino-spiropyran,
6'-bromo-3'-methoxy-benzoindolino-spiropyran,
3-(2'-hydroxy-4'-dimethylaminophenyl)-3-(2'-methoxy-5'-chlorophenyl)phthalide,
3-(2'-hydroxy-4'-dimethylaminophenyl)-3-(2'-methoxy-5'-nitrophenyl)phthalide,
3-(2'-hydroxy-4'-diethylaminophenyl)-3-(2'-methoxy-5'-methylphenyl)phthalide,
3-(2'-methoxy-4'-dimethylaminophenyl)-3-(2'-hydroxy-4'-chloro-5'-methylphenyl)phthalide,
3-morpholino-7-(N-propyl-trifluoromethylanilino)fluoran,
3-pyrrolidino-7-trifluoromethylanilinofluoran,
3-diethylamino-5-chloro-7-(N-benzyl-trifluoromethylanilino)fluoran,
3-pyrrolidino-7-(di-p-chlorophenyl)methylaminofluoran,
3-diethylamino-5-chloro-7-(α-phenylethylamino)fluoran,
3-(N-ethyl-p-toluidino)-7-(α-phenylethylamino)fluoran,
3-diethylamino-7-(o-methoxycarbonylphenylamino)fluoran,
3-diethylamino-5-methyl-7-(α-phenylethylamino)fluoran,
3-diethylamino-7-piperidinofluoran,
2-chloro-3-(N-methyltoluidino)-7-(p-n-butylanilino)fluoran,
3-(N-benzyl-N-cyclohexylamino)-5,6-benzo-7-α-naphthylamino-4'-bromofluoran, and
3-diethylamino-6-methyl-7-mesidino-4',5'-benzofluoran.

In the present invention, a variety of conventional electron acceptors and oxidizing agents such as inorganic acids, organic acids, phenolic materials, and phenolic resins as shown below, can be used as color developers.

Specific examples of such color developers are bentonite, zeolite, acidic terra abla, active terra abla, colloidal silica, zinc oxide, zinc chloride, zinc bromide, aluminum chloride, salicylic acid, 3-tert-butylsalicylic acid, 3,5-di-tert-butylsalicylic acid, di-m-chlorophenyl thiourea, di-m-trifluoromethylphenyl thiourea, diphenylthiourea, salicylanilide, 4,4'-isopropylidenediphenol, 4,4'-isopropylidenebis(2-chlorophenol), 4,4'-isopropylidenebis(2,6-dibromophenol), 4,4'-isopropylidenebis(2,6-dichlorophenol), 4,4'-isopropylidenebis-(2-methylphenol), 4,4'-isopropylidenebis(2,6-dimethylphenol), 4,4'-isopropylidenebis(2-tert-butylphenol), 4,4'-sec-butylidenediphenol, 4,4'-cyclohexylidenebisphenol, 4,4'-cyclohexylidenebis(2-methylphenol), 4-tert-butylphenol, 4-phenylphenol, 4-hydroxydiphenoxide, α-naphthol, β-naphthol, dimethyl 5-hydroxyphthalate, methyl-4-hydroxybenzoate, 4-hydroxyacetophenone, novolak-type phenolic resin, 2,2'-thiobis(4,6-dichlorophenol), catechol, resorcinol, hydroquinone, pyrogallol, phloroglucine, phloroglucino-carboxylic acid, 4-tert-octylcatechol, 2,2'-methylene-bis-(4-chlorophenol), 2,2'-methylenebis(4-methyl-6-tert-butylphenol), 2,2'-dihydroxydiphenyl, ethyl p-hydroxybenzoate, propyl p-hydroxybenzoate, butyl p-hydroxybenzoate, benzyl p-hydroxybenzoate, p-chlorobenzyl p-hydroxybenzoate, o-chlorobenzyl p-hydroxybenzoate, p-methylbenzyl p-hydroxybenzoate, n-octyl p-hydroxybenzoate, benzoic acid, zinc salicylate, 1-hydroxy-2-naphthoic acid, 2-hydroxy-6-naphthoic acid, zinc 2-hydroxy-6-naphthoate, 4-hydroxydiphenyl sulfone, 4,2'-diphenol sulfone, 4-hydroxy-4'-chlorodiphenyl sulfone, bis(4-hydroxyphenyl)sulfide, 2-hydroxy-p-toluic acid, zinc 3,5-di-tert-butylsalicylate, tin 3,5-di-tert-butylsalicylate, tartaric acid, oxalic acid, maleic acid, citric acid, succinic acid, stearic acid, 4-hydroxyphthalic acid, boric acid, biimidazole, hexaphenyl biimidazole, and carbon tetrabromide, methylene-bis-(oxyethylenethio)diphenol, ethylenebis-(oxyethylenethio) diphenol, bis-(4-hydroxyphenylthioethyl)ketone, bis-(4-hydroxyphenylthioethyl)ether, m-xylylenebis(4-hydroxyphenylthio)ether.

In the present invention, a variety of conventional binder agents can be employed for binding the above mentioned leuco dyes and color developers in the thermosensitive coloring layer to the support material. In order to prepare a pressure-sensitive recording material, the same conventional binder agents can also be employed for binding a microcapsuled leuco dye to its support, and for binding a color developer to its support.

Specific examples of such binder agents are as follows: polyvinyl alcohol; starch and starch derivatives; cellulose derivatives such as methoxycellulose, hydroxyethylcellulose, carboxymethylcellulose, methylcellulose and ethylcellulose; water-soluble polymeric materials such as sodiumpolyacrylate, polyvinylpyrrolidone, acrylamide/acrylic acid ester copolymer, acrylamide/acrylic acid ester/methacrylic acid copolymer, styrene/maleic anhydride copolymer alkali salt, isobutylene/maleic anhydride copolymer alkali salt, polyacrylamide, sodium aligante, gelatin and casein;

and latexes of polyvinyl acetate, polyurethane, styrene/butadiene copolymer, polyacrylic acid, polyacrylic acid ester, vinyl chloride/vinyl acetate copolymer, polybutylmethacrylate, ethylene/vinyl acetate copolymer and styrene/butadiene/acrylic acid derivative copolymer.

Further in the present invention, auxiliary additive components which are employed in the conventional pressure-sensitive and thermosensitive recording materials, such as a filler, a surface active agent, a thermofusible material (or unguent) and agents for preventing coloring by application of pressure can be employed.

Specific examples of a filler for use in the present invention are finely-divided inorganic powders of calcium carbonate, silica, zinc oxide, titaniumoxide, aluminum hydroxide, zinc hydroxide, barium sulfate, clay, talc, surface-treated calcium and surface-treated silica, and finely-divided organic powders of urea - formaldehyde resin, styrene/methacrylic acid copolymer, and polystyrene.

Examples of an unguent are higher fatty acids, metal salts thereof, higher fatty acid amides, higher fatty acid esters, and waxes such as animal waxes, vegetable waxes and petroleum waxes.

In the present invention, when a pressure-sensitive recording material is prepared, a color developer sheet is prepared as follows. A color developer is dispsersed or dissolved in water or an organic solvent with addition thereto of an appropriate dispersing agent, such as a block copolymer of polyoxypropylene - polyoxyethylene, and an appropriate binder agent to prepare a dispersion or solution. The thus prepared dispersion or solution is applied to a support such as a sheet of paper, whereby a color developer sheet is prepared. A coloring sheet is prepared by dispersing a microcapsuled leuco dye in an appropriate solvent with addition thereto of a dispersing agent, and applying the dispersion to a support such as a sheet of paper. The microcapsuling of the leuco dye is carried out by such a conventional method as described in U.S. Pat. No. 2,800,457.

A thermosensitive recording material according to the present invention is prepared by preparing a dispersion of a leuco dye and a dispersion of a color developer separately, mixing these dispersions with addition thereto of an appropriate binder agent, and applying the mixed dispersion to a support such as a sheet of paper to form a thermosensitive coloring layer thereon.

The thermosensitive coloring layer can be formed so as to include a leuco dye layer and a color developer layer or a plurality of leuco dye layers and color developer layers. Furthermore, an undercoat layer can be formed between the support and thermosensitive coloring layer. A protective layer can also be formed on the thermosensitive coloring layer.

Furthermore, a thermal image transfer type recording material can be prepared, in which the leuco dye and the color developer are supported on two supports separately, that is, an image transfer sheet consisting of a heat resistant sheet made of, for instance, a polyester film, coated with a leuco dye, and an image receiving sheet consisting of a support coated with a color developer. The coating of the leuco dye and the color developer can be carried out, for instance, by dispersing or dissolving each of the leuco dye and the color developer in water or a solvent and coating the dispersion or solution on each support.

The thermosensitive recording material can be modified into a thermosensitive recording label consisting of a support, a thermosensitive coloring layer formed thereon, an adhesive layer formed on the back side of the support opposite to the thermosensitive color layer, and a disposable backing sheet applied to the adhesive layer. A protective layer comprising a water-soluble resin can also be formed on the thermosensitive coloring layer to enhance the stability of recording images.

The features of this invention will become apparent in the course of the following description of exemplary embodiments, which are given for illustration of the invention and are not intended to be limiting thereof.

EXAMPLE 1

[Preparation of Phthalide Compound No. 1 in Table 1]

12.0 g of 4'[N-{p-(dimethylaminophenyl)}-N-methyl]-2-carboxybenzophenone and 7.9 g of 1,1-bis(p-dimethylaminophenyl)ethylene were added to 90 ml of acetic anhydride to prepare a reaction mixture. This reaction mixture was heated to 55°~60° C. and stirred for 1 hour. The reaction mixture was then added to 200 ml of water. The mixture was then neutralized with addition of an ammonia water. A green precipitate separated out, which was filtered off.

The precipitate was added to a mixture of 100 ml of a 10% aqueous solution of sodium hydroxide and 100 ml of toluene. The mixture was heated with stirring, for 30 minutes, after which the toluene phase was separated and washed with water. Then, after drying, the toluene was evaporated off, so that a solid material was obtained. The solid material thus obtained was purified by column chromatography and a light yellow compound was obtained with a yield of 13.5 g, which is a phthalide compound No. 1 in Table 1.

This compound exhibited a strong absorption in the 600 nm of 1000 nm region in acetic acid. An infrared absorption spectrum of this compound is shown in the accompanying single drawing.

The results of elemental analysis for this compound are as follows:

|  | % H | % C | % N |
| --- | --- | --- | --- |
| Found | 6.80 | 78.85 | 8.94 |
| Calculated | 6.80 | 79.07 | 9.00 |

All the compounds in Table 1 can be obtained by the same operation as Example 1, except that the temperatures of reaction range from 45° to 90° C. In addition, all these products are strongly absorbent in the near infrared region, specifically in the 60 nm to 100 nm range.

[Preparation of Microcapsuled Leuco Dyes]

10 parts by weight of gelatin and 10 parts by weight of gum arabi are dissolved in 400 parts by weight of water. To this solution, 0.2 parts by weight of Turkey red oil serving as emulsifying agent are added. Any of the phthalide leuco dyes represented by the general formula [I] is dissolved in diisopropryl napthalene oil with a concentration on of 2%. 40 parts by weight of the diisopropyl naphthalene oil solution are added to the above prepared solution and the mixture is emulsified. When the average particle size of the droplets in the emulsion becomes 5 μm, the emulsifying operation is terminated. To this emulsion, water warmed to 40° C. is added until the entire volume of the mixture became 900 parts by weight. The mixture is stirred, with its temperature maintained not less than 40° C. An aqueous 10% solution of acetic acid is added to this mixture so that the pH is adjusted to be in the range of 4.0 to 4.2, thereby coacervation is caused to take place. The stirring is continued for another 20 minutes. The mixture is then cooled so that a coacervated film deposited on each droplet was caused to be geled. With the temperature of the mixture adjusted to be 20° C., 7 parts by weight of an aqueous 37% solution of formaldehyde are added to the mixture. When the temperature of the mixture becomes 10° C., an aqueous 15% solution of sodium hydroxide is gradually added to the mixture so that the pH of the mixture is adjusted to be 9. The mixture is heated to 50° C., with stirring, taking a period of time of 20 minutes, whereby microcapsules of the leuco dye which is dissolved in the diisopropyl naphthalene oil are prepared.

When a pressure-sensitive sheet is prepared, the thus prepared microcapsules are applied to a support, with a deposition ranging from 5 g/m$^2$ to 10 g/m$^2$.

EXAMPLES 2~4 AND COMPARATIVE EXAMPLES 1 & 2

[Preparation of Pressure-sensitive Recording Materials]

Pressure-sensitive recording materials No. 1 to No. 3 according to the present invention and comparative pressure-sensitive recording materials No. 1 and No. 2, each coated with a microcapsulated leuco dye listed in Table 2 in an amount of 6 g/m$^2$ when dried, using a water-soluble starch as binder agent for the leuco dye, were prepared. Each of the pressure-sensitive recording materials was superimposed on a commercially available pressure-sensitive color developing sheet containing as a color developer acidic terra abla, and by hand writing, pressure-sensitive coloring was caused to take place in each pressure-sensitive recording material, so that clear images in green to dark greenish blue were obtained.

The PCS value of each obtained image, defined by the following formula, and measured by a commercially available spectrophotometer (Trademark "Hitachi 303 Type Spectrophotometer" made by Hitachi, Ltd.) when exposed to the light having a wavelength of 800 nm, is shown in Table 2.

$$PCS\ Value\ (\%) = \frac{\left(\begin{array}{c}\text{Reflection Ratio}\\\text{of Background}\end{array}\right) - \left(\begin{array}{c}\text{Reflection Ratio}\\\text{of Image Area}\end{array}\right)}{\text{Reflection Ratio of Background}} \times 100\%$$

TABLE 2

| | Phthalide Leuco Dyes | PCS Value |
|---|---|---|
| Example 2 | No. 1 in Table 1 | 90% or more |
| Example 3 | No. 22 in Table 1 | 90% or more |
| Example 4 | No. 27 in Table 1 | 90% or more |
| Comp. Ex. 1 | Crystal Violet Lactone | 30% or less |
| Comp. Ex. 2 | 3-diethylamino-6-methyl-7-anilinofluoran | 30% or less |

TABLE 2-continued

| Phthalide Leuco Dyes | PCS Value |
|---|---|
| anilinofluoran | |

As clearly shown in Table 2, the pressure-sensitive recording materials according to the present invention have a strong absorption in the near infrared region, to a degree which has been previously unobtainable.

EXAMPLES 5~9, COMPARATIVE EXAMPLES 3 & 4

[Preparation of Coloring Liquid (Liquid A) and Color Developer Liquid (Liquid B)]

The following Liquid A and Liquid B were prepared by grinding the respective components in a ceramic ball mill

| | Parts by Weight |
|---|---|
| [Liquid A] | |
| Phthalide Leuco dye in Table 3 | 20 |
| Aqueous 10% solution of polyvinyl alcohol | 10 |
| Dispersing agent (block copolymer of polyoxypropylene and polyoxyethylene) | 0.3 |
| Water | 37 |
| [Liquid B] | |
| 1,4-bis(phenylthio)butane | 40 |
| Bisphenol S | 60 |
| Calcium carbonate | 80 |
| Aqueous 10% solution of polyvinyl alcohol | 160 |
| Dispersing agent (block copolymer of polyoxypropylene and polyoxyethylene) | 5 |
| Water | 60 |

[Preparation of Thermosensitive Recording Materials]

Liquid A and Liquid B were mixed with a ratio by parts weight of 1:1, whereby a thermosensitive layer coating liquid was prepared. This coating liquid was coated on a sheet of high quality paper having a basis weight of 50 g/m$^2$, in such a manner that the amount of the dye solid component was 0.5 g/m$^2$, whereby thermosensitive recording materials Nos. 1 through 5 according to the present invention and comparative thermosensitive recording mateials Nos. 1 and 2 were prepared.

The thus prepared thermosensitive recording materials were subjected to thermal printing by use of a conventional thermal printer. The density of the developed images was measured by Macbeth densitometer RD-514 with a filter W-106.

The PCS value of each thermosensitive recording material was also measured in the same manner as previously mentioned.

The light resistance of each thermosensitive recording material was measured by measuring the image density and background density after exposing each thermally printed sample to 5,000 lux for 1000 hours.

TABLE 3

| | Phthalide Leuco Dyes in Table 1 | Background Density | Image Density | Developed Color Tone | PCS Value at 850 nm | After Light Resistant Test | |
|---|---|---|---|---|---|---|---|
| | | | | | | Background Density | Image Density |
| Example 5 | No. 2 | 0.07 | 1.35 | Dark Green | 90% or more | 0.08 | 1.34 |
| Example 6 | No. 1 | 0.07 | 1.37 | Dark Green | 90% or more | 0.08 | 1.35 |
| Exanple 7 | No. 11 | 0.07 | 1.35 | Dark Green | 90% or more | 0.09 | 1.33 |

TABLE 3-continued

| | Phthalide Leuco Dyes in Table 1 | Background Density | Image Density | Developed Color Tone | PCS Value at 850 nm | After Light Resistant Test Background Density | After Light Resistant Test Image Density |
|---|---|---|---|---|---|---|---|
| Example 8 | No. 23 | 0.08 | 1.39 | Greenish Blue | 90% or more | 0.09 | 1.38 |
| Example 9 | No. 28 | 0.07 | 1.30 | Greenish Blue | 90% or more | 0.08 | 1.28 |
| Comp. Example 3 | Crystal Violet Lactone | 0.09 | 1.30 | Bluish Violet | 10% or less | 0.20 | 1.15 |
| Comp. Example 4 | 3-diethylamino 6-methyl-7-anilino fluoran | 0.08 | 1.30 | Black | 10% or less | 0.12 | 1.30 |

As clearly shown from the results in Table 3, the thermosensitive recording materials of the present invention demonstrate an absorption in the near infrared region to a degree which has been previously unobtainable. In addition, the background and color developed images are also seen to have a highly superior resistance to light.

The coloring phthalide compounds represented by General Formula [I] are also shown to have color-developed images which demonstrate a strong absorption in the 600 to 1000 nm range, so that an image from a recording material containing these compounds can be adequately read by means of a general optical character reader (OCR) or by an image reading apparatus for which the light source is a light emitting diode or a semiconductor laser. In addition, the method of producing the compounds of the present invention represented by general formula [I] is very simple. Also, because the object components are obtained at a high yield, the method can be profitably applied to an industrial process.

What is claimed is:

1. A recording material, comprising a substrate and a coloring component thereon comprising a phthalide compound having the formula:

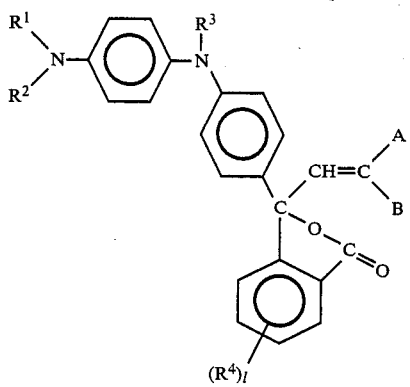

wherein $R^1$ and $R^2$ each represent a straight chain or a branched alkly group having 1 to 6 carbon atoms, a cycloalkyl group, or a benzyl group, or $R^1$ and $R^2$ in combination form a ring; $R^3$ represents an alkyl group having 1 to 4 carbon atoms; $R^4$ represents a dialkylamino group having 1 to 6 carbon atoms, a cyclic amino group or halogen; l is an integer of 0 to 4; A represents a group of the formula:

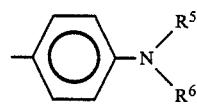

wherein $R^5$ and $R^6$ each represent a straight chain or a branched alkyl group having 1 to 8 carbon atoms, cycloalkyl group, or a benzyl group, or $R^5$ and $R^6$ in combination form a ring; and B is the same as A or represents a phenyl group which is unsubstituted or is substituted.

2. The recording material as claimed in claim 1, wherein for said phthalide compound, $R^1$ and $R^2$ are each an alkyl group having 1 to 5 carbon atoms, a cyclohexyl group, or a benzyl group, or $R^1$ and $R^2$ in combination form a piperidine ring; $R^3$ represents an alkyl group of 1 to 3 carbon atoms; $R^4$ represents a dimethylamino group, a chloro or bromo group; A represents a N-dimethylanilino or N-diethylanilino group; and B represents a N-dimethylanilino, N-diethylanilino, p-methoxybenzene, p-chlorobenzene or benzene group.

3. The recording material as claimed in claim 1, which further comprises, in addition to said phthalide compound, one or more leuco dyes.

4. The recording material as claimed in claim 3, wherein said leuco dye is a triphenylmethane-leuco dye, a fluoran-leuco dye, a phenothiazine-leuco dye, an auramine-leuco dye, a spiropyran-leuco dye and an indolino-phthalide-leuco dye.

5. The recording material as claimed in claim 3, which further comprises an electron acceptor or oxidizing agent as a color developer.

6. The recording material as claimed in claim 3, which further comprises a binder agent for binding said leuco dyes and color developers to said substrate.

* * * * *